Aug. 7, 1945.   R. O. BONINE   2,381,254
CIRCUIT BREAKER CONTROL
Filed Dec. 11, 1943
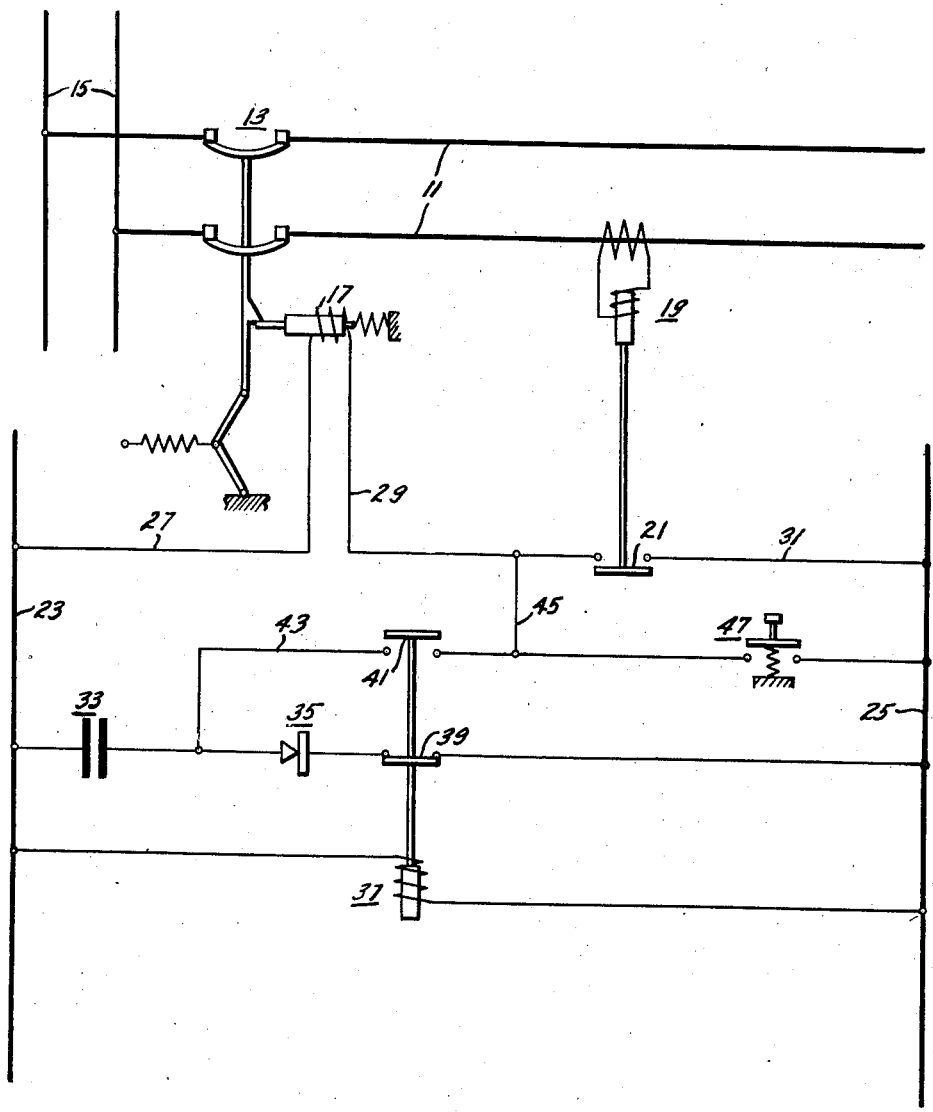
WITNESSES:
Alice L. Howell
Paul H. Harlen
INVENTOR
Ralph O. Bonine.
BY
Ralph H. Swingle
ATTORNEY Patented Aug. 7, 1945

2,381,254

UNITED STATES PATENT OFFICE 2,381,254

CIRCUIT BREAKER CONTROL

Ralph O. Bonine, Edgewood, Pa., assignor to Westinghouse Electric Corporation, East Pittsburgh, Pa., a corporation of Pennsylvania Application December 11, 1943, Serial No. 513,838

8 Claims. (Cl. 175—294)

This invention relates to circuit breakers and, more particularly, to operating and tripping means for circuit breakers.

It is sometimes desirable to provide means for tripping open a circuit breaker upon loss of voltage in the control circuit or when the voltage of the control circuit falls below normal a predetermined amount. For example, in the operation of arc furnaces a separate source of D. C. control current is usually provided. This source may be derived from a generator, a large storage battery or any other suitable source. The control current in such installations, in addition to controlling other translating devices, is utilized to control the electrodes of the arc furnace. In the event of a loss of voltage in the control circuit, or when the voltage of the control circuit falls below a predetermined amount, the control of the electrodes is interrupted and it is desirable to interrupt the main circuit supplying the arc furnace. The instant invention provides improved means operable in response to a drop in voltage or loss of voltage in the control circuit to trip open the circuit interrupter which controls the main supply of electrical energy.

Undervoltage trip devices usually employed to trip circuit breakers are provided with spring biased tripping mechanisms controlled by an armature held by a voltage responsive electromagnet. Upon the occurrence of a predetermined loss of voltage in the circuit, the electromagnet releases the armature and the spring effects tripping of the breaker. Such devices are subject to release in response to shocks and jarring forces, and are very difficult to adjust and to maintain in proper adjustment.

One object of the invention is to provide a circuit breaker having an improved capacitor trip device which will trip the breaker upon a loss of voltage or upon a predetermined drop in voltage in the control circuit.

Another object of the invention is to provide a circuit breaker having a trip device wherein the breaker is tripped open in response to overload conditions in the circuit controlled by the breaker and which is provided with a capacitor trip device for tripping the breaker in response to a predetermined drop in voltage in the control circuit.

Another object of the invention is to provide a circuit breaker with an improved trip device wherein the breaker is tripped in response to loss of voltage in the control circuit by discharging a capacitor through the overload trip magnet.

Another object of the invention is to provide a circuit breaker with an improved tripping means which is simple in construction, reliable, and efficient in operation, and inexpensive to manufacture.

The novel features that are considered characteristic of the invention are set forth in particular in the appended claims. The invention itself, however, both as to structure and operation, together with additional objects and advantages thereof, will be best understood from the following description thereof when read in conjunction with the accompanying drawing, the single figure of which is a diagrammatic view of a circuit breaker and control system therefor embodying the improved tripping means.

As diagrammatically shown in the drawing, the invention is applied to the protection of a feeder of load line 11 which is connected by means of a circuit breaker 13 to a bus means 15. The circuit breaker 13 is provided with a trip coil 17 which, when energized, effects opening of the circuit breaker. The trip coil 17 is energized in response to abnormal conditions such as an overload or short circuit in the load line 11 by means of a protective relay 19 whose contacts 21 are connected in series relation with the trip coil 17 connected to circuit 23—25 which is energized from a suitable source of electrical energy. One side of the trip coil 17 is connected to the conductor 23 by a wire 27. The other side of the trip coil is connected by means of a wire 29, relay contacts 21 and a wire 31 to the conductor 25. The circuit for energizing the trip coil extends from the conductor 23 over the wire 27, the trip coil 17, wire 29, contacts 21, and wire 31 to the conductor 25. The source of energy for the circuit 23—25 may be a storage battery, a motor generator, or the circuit may be energized from the circuit 11 by means of a conventional transformer.

It will be obvious that energization of the protective relay 19 in response to overload conditions on the load line will close the contacts 21, thus energizing the trip coil 17 to trip the breaker.

The undervoltage trip device which operates to trip the breaker in response to loss or reduction of voltage in the control circuit comprises a capacitor 33, a rectifier 35 connected in series with the capacitor 33 across the conductors 23—25, and an undervoltage relay 37. The circuit for energizing the capacitor 33 extends from the conductor 23 to one side of the capacitor 33, through the rectifier 35, normally closed contacts 39 of the undervoltage relay to the conductor 25. The coil of the undervoltage relay 37 is connected directly across the control circuit conductors 23—25.

In operation, the control-voltage normally charges the capacitor 33 through the rectifier 35 which causes unidirectional voltage of the control circuit to be impressed on the capacitor. Upon the occurrence of a predetermined loss or drop of voltage in the control circuit 23—25, the energization of the relay 37 is reduced to a point where the relay acts to open the contacts 39 and close contacts 41. Opening of the contacts 39 opens the charging circuit for the capacitor 33, and closing of the contacts 41 connects the capacitor in a circuit which discharges the capacitor through the trip coil 17, thereby energizing the trip magnet and tripping the breaker. The circuit whereby the capacitor 33 energizes the trip coil 17 extends from one side of the capacitor over a wire 43, contacts 41, a wire 45, wire 29, trip coil 17, wires 27 and 23 to the other side of the capacitor.

In the event of loss of voltage between the control circuit conductors 23—25, the rectifier 35 prevents discharge of the capacitor before the trip magnet functions to trip the breaker. This is due to the fact that the rectifier permits current to flow in one direction only thereby preventing discharge of the capacitor through the contacts 39 during the brief interval between the loss of voltage across the control circuit 23—25 and the opening of the contacts 39 and before the contacts 41 close to connect the rectifier to the trip magnet.

When the control voltage is restored to normal value, or is increased above a predetermined value, the relay 37 picks up, opening the contacts 41 and closing the contacts 39 to recharge the capacitor.

A switch 47 is provided for manually tripping the breaker open. The contacts of the switch 47 when closed, shunt the protective relay contacts 21, thus energizing the trip coil 17 from the conductors 23—25 to trip the breaker.

Having described the invention in accordance with the patent statutes, it is to be understood that various changes and modifications may be made therein without departing from some of the essential features of the invention. It is, therefore, desired that the language of the appended claims be given as reasonably broad interpretation as the prior art permits.

I claim as my invention:

1. A control system for a circuit breaker having tripping means, comprising a control circuit, means operable in response to abnormal conditions in the circuit controlled by the breaker to cause energization of said tripping means, a capacitor energized by said control circuit, and means responsive to predetermined conditions in said control circuit for disconnecting said capacitor from the control circuit and causing said capacitor to discharge through the tripping means to thereby trip the breaker.

2. A control system for a circuit breaker having tripping means, comprising a control circuit for energizing said tripping means, means responsive to predetermined abnormal conditions in the circuit controlled by the breaker to effect energization of said tripping means, a capacitor connected to be energized by said control circuit, and voltage responsive means operable in response to predetermined voltage conditions in the control circuit to disconnect said capacitor from the control circuit and to connect said capacitor across said tripping means to thereby effect tripping of the breaker.

3. A circuit breaker system comprising a circuit breaker, electroresponsive trip means operable when energized to trip the breaker, a control circuit for energizing said electroresponsive trip means, means responsive to predetermined conditions in the circuit controlled by the breaker for effecting energization of said electroresponsive trip means from said control circuit, a capacitor normally connected to said control circuit to be charged thereby, and means responsive to predetermined conditions in said control circuit to disconnect said capacitor from said control circuit and to cause said capacitor to energize said electroresponsive trip means.

4. A circuit breaker system comprising a circuit breaker, electroresponsive trip means for tripping said breaker, a control circuit for energizing said electroresponsive means, means responsive to predetermined abnormal conditions in the circuit controlled by the breaker for effecting energization of said electroresponsive trip means, a capacitor connected to be energized by said control circuit, and a transfer switch operable in response to predetermined conditions in the control circuit to disconnect said capacitor from the control circuit and to effect energization of said electroresponsive trip means by said capacitor.

5. A circuit breaker system comprising a circuit breaker, an electromagnet operable when energized to trip said breaker, a control circuit separate from the circuit controlled by the breaker for energizing said electromagnet, electroresponsive means operable in response to overload conditions in the circuit controlled by the breaker to cause energization of said electromagnet, a capacitor connected to be charged by said control circuit, and means responsive to predetermined voltage conditions in the control circuit to disconnect the capacitor from the control circuit and to connect said capacitor to effect energization of said electromagnet irrespective of the condition of the circuit controlled by the circuit breaker.

6. A control system for a circuit breaker comprising electroresponsive means operable when energized to trip the breaker, an energizing circuit separate from the circuit controlled by the breaker for energizing said electroresponsive means, means operable in response to overload conditions in the circuit controlled by the breaker to cause energization of said electroresponsive means, energy storing means normally energized by the voltage of said energizing circuit, and means responsive to predetermined voltage conditions in the energizing circuit to disconnect said energy storing means from said energizing circuit and to connect said energy storing device to said electroresponsive means.

7. A control system for a circuit breaker having tripping means, comprising a control circuit, means operable in response to abnormal conditions in the circuit controlled by the breaker to effect energization of said tripping means, electrical energy storing means energized by said control circuit, and means responsive to predetermined conditions in said control circuit to disconnect said energy storing means from the control circuit and to cause said energy storing means to energize the tripping means.

8. In combination, a circuit breaker having operating means and a trip device for tripping the breaker, a circuit for energizing said trip device, control means operable to connect said trip device to said energizing circuit, an electrical energy storage device normally energized by the voltage of said energizing circuit, voltage responsive relay means normally connecting said energy storage device and said energizing circuit and operable when the voltage of said energizing circuit is below a predetermined value to disconnect said energy storage device from said energizing circuit and connect said energy storage device to said trip device.

RALPH O. BONINE.